US006788252B2

(12) United States Patent
Doi

(10) Patent No.: US 6,788,252 B2
(45) Date of Patent: Sep. 7, 2004

(54) COMMUNICATION SYSTEM USING NON-DIRECTIONAL SHORT RANGE RADIO COMMUNICATIONS BETWEEN USER TERMINAL DEVICE AND ROAD RELATED FACILITY

(75) Inventor: Miwako Doi, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 10/107,432

(22) Filed: Mar. 28, 2002

(65) Prior Publication Data

US 2002/0140604 A1 Oct. 3, 2002

(30) Foreign Application Priority Data

Mar. 28, 2001 (JP) ....................................... 2001-093353

(51) Int. Cl.[7] .................................................. G01S 1/00
(52) U.S. Cl. ....................................... 342/385; 340/905
(58) Field of Search .......................... 342/385; 340/904, 340/905

(56) References Cited

U.S. PATENT DOCUMENTS 3,824,469 A * 7/1974 Ristenbatt
5,198,811 A * 3/1993 Potter et al. ................ 340/905

* cited by examiner

*Primary Examiner*—Theodore M. Blum
(74) *Attorney, Agent, or Firm*—Oblon, Spivak, McClelland, Maier & Neustadt, P.C.

(57) ABSTRACT

A communication system is formed by a location information providing unit configured to provide a location information indicating a location of each road related facility arranged along a road, and a communication unit installed on each road related facility, configured to transmit the location information of each road related facility to a terminal device of a user on the road by using weak radio signals, such that the terminal device that can receive the weak radio signals can detect a location of the terminal device according to the location information.

15 Claims, 9 Drawing Sheets

COMMUNICATION SYSTEM USING NON-DIRECTIONAL SHORT RANGE RADIO COMMUNICATIONS BETWEEN USER TERMINAL DEVICE AND ROAD RELATED FACILITY

BACKGROUND OF THE INVENTION

1. Field of the Invention

The present invention relates to a communication system, a base station, and an information providing method for providing information to a terminal device.

2. Description of the Related Art

Conventionally, systems to be utilized by a user of a terminal device at a time of passing through a road include a system for checking a current location of the terminal device and a system for providing a regional information such as that of restaurants, amusement spots, road maps, etc., according to the current location of the terminal device. In these systems, the location of the terminal device is detected by a method using the GPS (Global Positioning System), a method using the cell ID assigned to each base station provided in a service providing area of the so called cellular type portable telephone service, etc.

In the method using the GPS, a GPS receiver is provided on the terminal device, and the location is detected by receiving GPS signals transmitted from a plurality of GPS satellites. Also, in the method using the cell ID, the location is detected from the cell ID of the base station of a cell in which the terminal device is located by utilizing the cell IDs of the base stations that are necessary for the purpose of the cellular type portable telephone service.

On the other hand, when the user of the terminal device passes through a road, there is a need to obey the traffic signals for regulating traffic of the road. A state of the traffic regulation to be realized by the traffic signal is normally notified to the user by the color of a signaling light or the sound from a loudspeaker provided on the traffic signal.

However, in the method using the GPS described above, there is a need to provide the GPS receiver on the terminal device, and the power consumption of the GPS receiver is large so that there has been a problem that the power consumption of the terminal device increases. Also, in the method using the cell ID, there is no need to provide a special receiver, the location is detectable only in the cell ID unit so that there has been a problem that a precision of the location detection is low. For example, in the case of the PHS (Personal Handyphone System), there has been an error of approximately 100 m. In addition, because there is an error in the detected location of the terminal device, there has also been a problem that, even if the regional information according to the detected location is provided, the provided regional information will not match with the actual location of the terminal device.

Also, in the method for notifying the state of the traffic regulation by the traffic signal using the color of the signaling light or the sound from the loudspeaker provided on the traffic signal, there are cases where it is difficult to comprehend a message of the signal as in the case of a visually or aurally handicapped person or the case where it is unclear as to which sound is indicating which direction is traversable.

BRIEF SUMMARY OF THE INVENTION

It is therefore an object of the present invention to provide a communication system capable of detecting the accurate location of the terminal device while suppressing the power consumption of the terminal device.

It is another object of the present invention to provide a communication system and an information providing method capable of enabling an easy comprehension of the state of the traffic regulation by the traffic signal.

According to one aspect of the present invention there is provided a communication system, comprising: a location information providing unit configured to provide a location information indicating a location of each road related facility arranged along a road; and a communication unit installed on each road related facility, configured to transmit the location information of each road related facility to a terminal device of a user on the road by using weak radio signals, such that the terminal device that can receive the weak radio signals can detect a location of the terminal device according to the location information.

According to another aspect of the present invention there is provided a communication system, comprising: a police server configured to manage police information database; and a communication unit installed on each road related facility arranged along a road, configured to receive a police information transmitted from a terminal device of a user on the road by using the weak radio signals, and transmit the police information to the police server.

According to another aspect of the present invention there is provided a communication system, comprising: a control unit configured to control a traffic signal on a road to carry out a traffic regulation; and a communication unit installed on the traffic signal, configured to transmit a traffic regulation information regarding the traffic regulation carried out by the traffic signal to a terminal device of a user on the road in response to a request from the terminal device.

According to another aspect of the present invention there is provided a communication method, comprising: providing a location information indicating a location of each road related facility arranged along a road; and transmitting the location information of each road related facility to a terminal device of a user on the road by using weak radio signals from a communication device installed on each road related facility, such that the terminal device that can receive the weak radio signals can detect a location of the terminal device according to the location information.

According to another aspect of the present invention there is provided a communication method, comprising: managing police information database at a police server; and receiving a police information transmitted from a terminal device of a user on a road by using the weak radio signals at a communication device installed on each road related facility arranged along the road, and transmitting the police information to the police server.

According to another aspect of the present invention there is provided a communication method, comprising: controlling a traffic signal on a road to carry out a traffic regulation; and transmitting a traffic regulation information regarding the traffic regulation carried out by the traffic signal from a communication device installed on each road related facility arranged along a road to a terminal device of a user on the road in response to a request from the terminal device.

Other features and advantages of the present invention will become apparent from the following description taken in conjunction with the accompanying drawings.

DETAILED DESCRIPTION OF THE INVENTION

Referring now to FIG. 1 to FIG. 13, one embodiment of a communication system according to the present invention will be described in detail.

(Overall configuration of the communication system)

Figure 1:
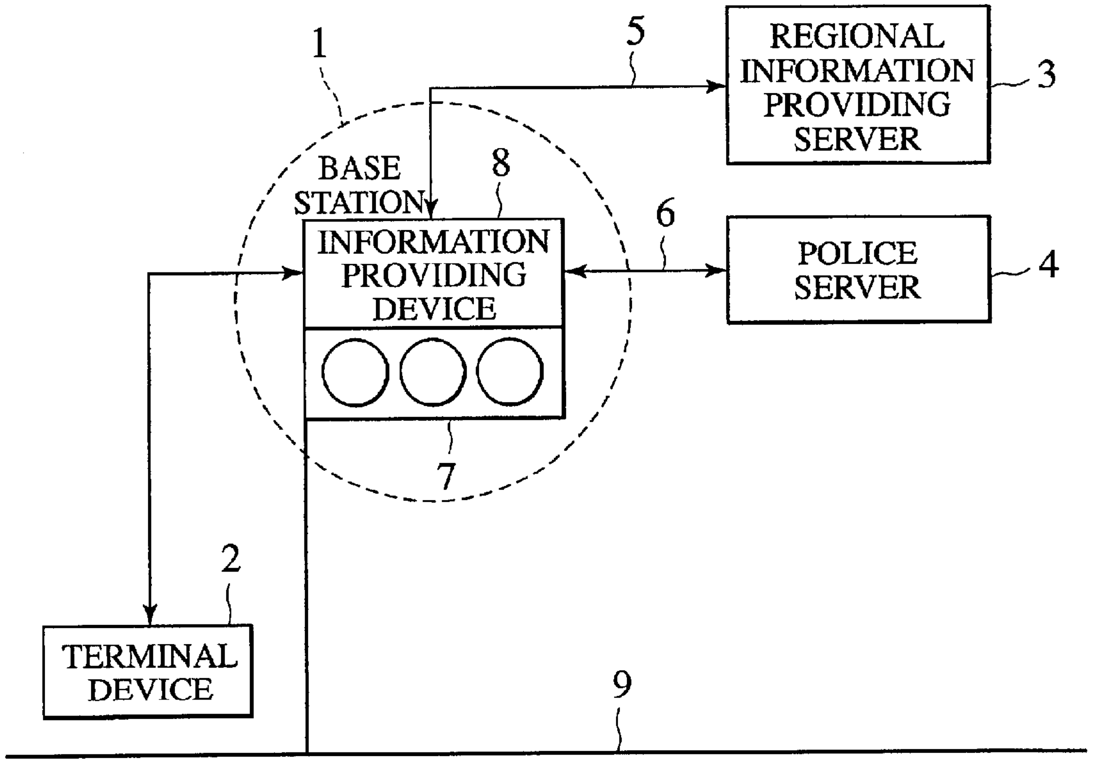
FIG. 1 is a block diagram showing a schematic configuration of a communication system according to one embodiment of the present invention.

FIG. 1 shows a schematic configuration of the communication system according to this embodiment. As shown in FIG. 1, the communication system of this embodiment comprises a base station 1, a terminal device 2 to be carried around by a user, a regional information providing server 3, a police server 4, a communication network 5 for connecting the base station 1 with the regional information providing server 3, and a communication network 6 for connecting the base station 1 with the police server 4.

As shown in FIG. 1, the base station 1 comprises a traffic signal 7 and an information providing device 8. The traffic signal 7 is an example of a road related facility (construction) arranged along a road 9, which is used for regulating traffic of the road 9. Here, the road related facility to be utilized in this embodiment must be a construction to be arranged along the road 9, and besides the traffic signal, it is also possible to use other constructions such as a police box, a mailbox, a guardrail, a signpost, a road lamp, a pedestrian crossing bridge, etc. The base station 1 is constructed by utilizing the road related facility arranged along the road in this way, so that the base station 1 can be provided easily.

Figure 2:
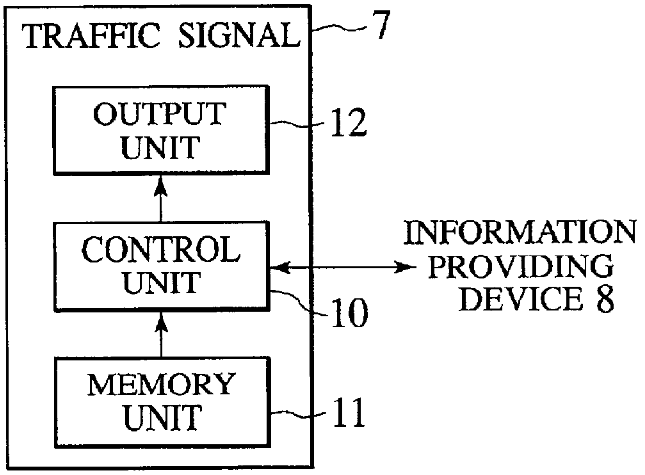
FIG. 2 is a block diagram showing a functional configuration of a traffic signal in the communication system of FIG. 1.

FIG. 2 shows a functional configuration of the traffic signal 7 according to this embodiment. As shown in FIG. 2, the traffic signal 7 comprises a control unit 10, a memory unit 11, and an output unit 12.

The control unit 10 controls the traffic regulation to be carried out by the traffic signal 7. In this embodiment, the traffic signal 7 capable of changing patterns of the traffic regulation is used. The memory unit 11 stores an ordinary pattern of the traffic regulation to be used by the control unit 10. Here, the traffic regulation pattern is defined by a combination of stages such as a traversable stage, a transition state from a traversable state to a non-traversable state, a non-traversable stage, a transition stage from a non-traversable state to a traversable state, as well as their order and a duration of each stage, etc.

Also, in general, the traffic regulation to be carried out by the traffic signal 7 is notified to the pedestrians on the road 9 by the color of the signaling light on the traffic signal 7. For this reason, the traffic regulation pattern may be defined in terms of a lighting period, a flashing period, a lighting order, etc., of a green signal indicating the traversable state, a red signal indicating the non-traversable state, and a yellow signal indicating the transition stage from the traversable state to the non-traversable state.

The control unit 10 normally reads out the traffic regulation pattern stored in the memory unit 11, and controls the traffic regulation accordingly. Then, when the change of the traffic regulation pattern is requested from the terminal device 2 to the control unit 10, the control unit 10 carries out the traffic regulation by changing the traffic regulation pattern according to this request. Here, a request for changing the traffic regulation pattern or a request for providing an information regarding a state of the traffic regulation (which will be referred to as “traffic regulation information” hereafter) that is issued from the terminal device 2 is notified to the control unit 10 of the traffic signal 7 through the information providing device 8, and the traffic regulation information from the control unit 10 is notified to the terminal device 2 through the information providing device 8.

The output unit 12 outputs signals for the traffic regulation carried out by the control unit 10. For example, the signals for the traffic regulation carried out by the control unit 10 are outputted in forms of a signaling light in a specific color using a light source such as a lamp, LED, etc., or a specific sound from the loudspeaker.

Figure 3:
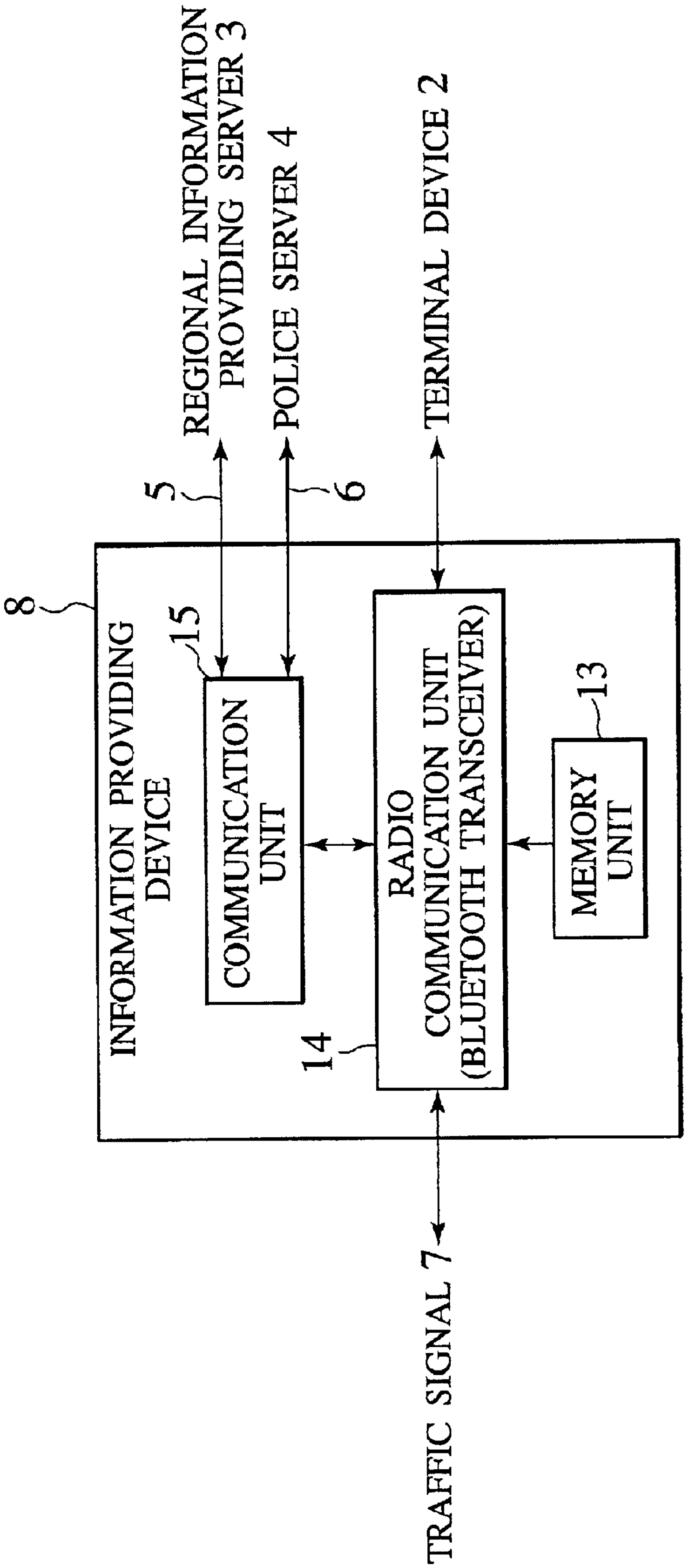
FIG. 3 is a block diagram showing a functional configuration of an information providing device in the communication system of FIG. 1.

FIG. 3 shows a functional configuration of the information providing device 8 according to this embodiment. The information providing device 8 is installed on the traffic signal 7, and transmits a location information of the traffic signal 7 to the terminal device 2, or transmits information to be provided to the terminal device 2 from the traffic signal 7, the regional information providing server 3 and the police server 4. As shown in FIG. 3, the information providing device 8 comprises a memory unit 13, a radio communication unit (Bluetooth transceiver) 14, and a communication unit 15.

The memory unit 13 functions as an element for providing the location information of the road related facility arranged along the road 9. In this embodiment, this element is provided in the information providing device 8 to be installed on the road related facility. The memory unit 13 stores only the location information of the road related facility and provides this location information to the radio communication unit 14. For example, when the information providing device 8 is installed on the traffic signal 7 located at a crossing on an X avenue and a Y street, the memory unit 13 stores the location information indicating the location of this traffic signal 7 as a crossing on the X avenue and the Y street, and provides this location information to the radio communication unit 14.

The radio communication unit 14 functions as an element for transmitting the location information of the road related facility by weak radio signals, as well as an element for transmitting the traffic regulation information for the traffic regulation carried out by the control unit 10. This radio communication unit 14 should be a device that is installable on the road related facility and capable of transmitting the location information by weak radio signals. Here, the weak radio signals are radio signals with an output power of about several mW, which have a reaching range of 10 cm to 10 m. Using such weak radio signals with the output power of several mW and the reaching range of 10 m or less, it is possible to improve the location detection precision.

Note that an element for transmitting the traffic regulation information can be provided in a form of a device that is installable on the road related facility and capable of transmitting the traffic regulation information, which is not necessarily limited to a device capable of using the weak radio signals.

Also, in the case of exchanging information that requires the secrecy such as the police information, the radio communication unit 14 should preferably be capable of carrying out the connection authentication for permitting the connection only with specific correspondent, and the encryption processing for preventing the eavesdropping of the information by a third party.

In this embodiment, the radio communication unit 14 is provided in a form of a Bluetooth transceiver. Here, the Bluetooth is an example of a non-directional short range radio data communication scheme that uses communication interfaces for carrying out a connection set up and communications by a specific sequence, using the weak radio signals with the frequency hopping in which 79 channels are set up in the bandwidth of 1 MHz in 2.4 GHz band used as the ISM (Industrial Scientific Medical) band and channels are switched 1600 times per second. The Bluetooth transceiver has the output power of about 1 mW and a reaching range of about 10 m, so that it is capable of improving the location detection precision of the terminal device 2 and it is also preferable because it is possible to carry out the connection authentication and the encryption processing.

Note that, in this embodiment, the radio communication unit 14 also has a function for receiving a request for providing the traffic regulation information or a request for changing the traffic regulation pattern with respect to the control unit 10 that is transmitted from the terminal device 2 and supplying it to the control unit 10, a function for acquiting the traffic regulation information to be provided to the terminal device 2 from the control unit 10 and transmitting it to the terminal device 2, a function for receiving the location information or the police information that is transmitted from the terminal device 2 and supplying it to the communication unit 15, a function for acquiring information to be provided to the terminal device 2 from the regional information providing server 3 or the police server 4 through the communication unit 15 and transmitting it to the terminal device 2.

The communication unit 16 carries out communications with the regional information providing server 3 through the communication network 5 or with the police server 4 through the communication network 6.

Figure 4:
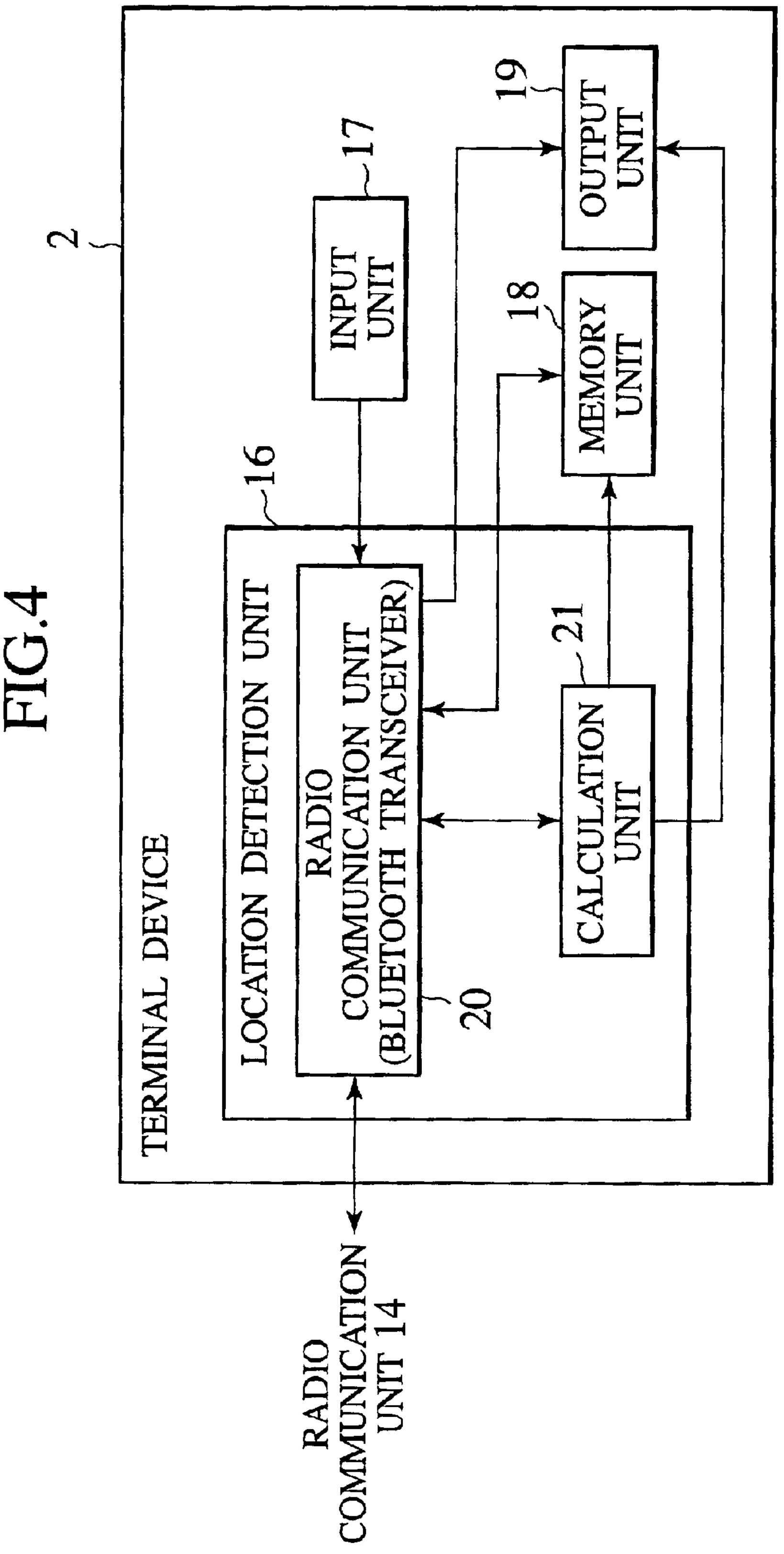
FIG. 4 is a block diagram showing a functional configuration of a terminal device in the communication system of FIG. 1.

FIG. 4 shows a functional configuration of the terminal device 2. The terminal device 2 is to be used by a pedestrian on the road 9, and can be provided in a form of a portable information terminal such as a portable telephone or a PDA (Personal Digital Assistant), for example. As shown in FIG. 4, the terminal device 2 comprises a location detection unit 16, an input unit 17, a memory unit 18 and an output unit 19.

The location detection unit 16 detects the location of the terminal device 2 by acquiring the location information transmitted from the radio communication unit 14 using the weak radio signals. In this embodiment, the location detection unit 16 comprises a radio communication unit (Bluetooth transceiver) 20 and a calculation unit 21. The radio communication unit 20 receives the location information transmitted from the radio communication unit 14 using the weak radio signals. In this embodiment, the radio communication unit 20 is provided in a form of the Bluetooth transceiver.

The calculation unit 21 calculates the location of the terminal device 2 according to the location information received by the radio communication unit 20. For example, the location can be calculated and detected under the assumption that the terminal device 2 is located within a circle of X m radius centered around a location indicated by the acquired location information of the road related facility. Here, the X m corresponds to the reaching range of the weak radio signals used for the radio communications.

In the case of acquiring the location information of the traffic signal 7 by using the weak radio signals from the radio communication unit 14 installed on the traffic signal 7 in this way, the terminal device 2 exists within the short reaching range of the weak radio signals from the traffic signal 7, so that it is possible to detect the accurate location by calculating the location of the terminal device 2 by the method described above, according to the location information of the traffic signal 7. In this method, the calculation unit 21 can obtain the location of the terminal device 2 easily without carrying out a complex calculation.

Also, the radio communication unit 20 of the terminal device can make connections with the radio communication units 14 of a plurality of base stations 1 located within the reaching range of the weak radio signals from the radio communication unit 20, and the calculation unit 21 can calculate and detect the location of the terminal device 2 by acquiring the location information of a plurality of the road related facilities and the received radio signal intensities from a plurality of the radio communication units 14. More specifically, the calculation unit 21 estimates a distance of the terminal device 2 from a road related facility on which each radio communication unit 14 is installed, according to the received radio signal intensity from each radio communication unit 14, and calculates and detects the location of the terminal device 2 according to the estimated distance and the acquired location information. In this way, it is possible to detect a more accurate location of the terminal device 2.

Note that, in this embodiment, the radio communication unit 20 also has a function for transmitting a request for providing the traffic regulation information or a request for changing the traffic regulation pattern with respect to the control unit 10, as well as the location information of the terminal device 2 or the police information to the radio communication unit 14, and a function for receiving information from the regional information providing server 3 or the police server 4, as well as the traffic regulation information transmitted from the radio communication unit 14. Also, in the case of exchanging information that requires the secrecy such as the police information, the radio communication unit 20 should preferably be capable of carrying out the connection authentication and the encryption processing.

The input unit 17 is a device on which the user of the terminal device 2 enters commands, etc., which can use keys or the like to be operated manually, as well as a microphone or the like for entering speech inputs. The memory unit 18 stores data such as the location information of the road related facility transmitted from the radio communication unit 14, the location of the terminal device 2 detected by the location detection unit 16, the command content of the request for providing the traffic regulation information, the command content of the request for changing the traffic regulation pattern, etc. In conjunction with the radio communication unit 20, the input unit 17 and the memory unit 18 function as an element for requesting the traffic regulation information providing and an element for requesting the traffic regulation pattern change with respect to the control unit 10.

For example, there are cases where it is difficult to accurately comprehend a state of the traffic regulation by the traffic signal 7, as in the case where the user of the terminal device 2 who is traversing the road 9 is a visually or aurally handicapped person, the case where it is unclear as to which sound is indicating which direction is traversable, or the case where the color of the signaling light or the sound from the loudspeaker is difficult to ascertain because of the background noises or the sunlight. In such cases, the request for providing the traffic regulation information will be made from the terminal device 2.

There are also cases where it is desired to extend the traversable period of time in the own moving direction because the traversing takes some time, as in the case where the user of the terminal device 2 who is going to traverse the road 9 is handicapped, wounded, aged, pregnant, or using a wheelchair or buggy. There are also cases where it is desired to shorten the traversable period of time in a direction crossing with the own moving direction because it is desired to traverse as soon as possible for various reasons. There are even cases where it is desired to make all the directions of the crossing non-traversable. In such cases, the request for changing the traffic control regulation to extend or shorten the traversable period of time or making all the directions non-traversable will be made from the terminal device 2.

The request for providing the traffic regulation information or the request for changing the traffic regulation pattern as described above is made by entering a command for the providing request or a command for the changing request at the input unit 17 and transmitting that command at the radio communication unit 20. In the case where it is always desired to make the request for providing the traffic regulation information with respect to the traffic signal 7 because the user is visually or aurally handicapped, or the case where it is always desired to make the request for changing the traffic regulation pattern with respect to the traffic signal 7 because the user is handicapped or aged, it is possible to store the command content of the providing request or the command content of the changing request in the memory unit 18 in advance, such that the radio communication unit automatically acquires the command from the memory unit 18 and transmit it when the connection between the radio communication unit 14 and the radio communication 20 is established.

Also, in the case where it is desired to always make the request for providing the traffic regulation information or the request for changing the traffic regulation pattern as described above, it is possible to assign a registration number, symbol or the like to the terminal device, define the command content of the providing request or the command content of the changing request corresponding to that number or the like, store that number or the like in the memory unit 18 in advance, and store a relationship between that number or the like and the command content of the providing request or the command content of the changing request in the memory unit 11 of the traffic signal 7 in advance.

In this case, the terminal device 2 can provide the number or the like of the terminal device 2 as the providing request or the changing request with respect to the control unit 10, and the control unit 10 which acquired that number of the like can retrieve the command content of the providing request or the changing request made by the user of the terminal device 2 having that number or the like from the memory unit 11 according to the acquired number or the like, and provide the traffic regulation information or control the traffic regulation pattern according to the acquired command content of the providing request or the changing request.

The output unit 19 outputs the regional information, the police information or the traffic regulation information received by the radio communication unit 20 or the location of the terminal device 2 detected by the location detection unit 16, and can be provided in a form of a display for outputting information by displaying characters or images, a loudspeaker for outputting information by sounds, a vibrator for outputting information by vibration, etc., or any desired combination thereof.

Figure 5:
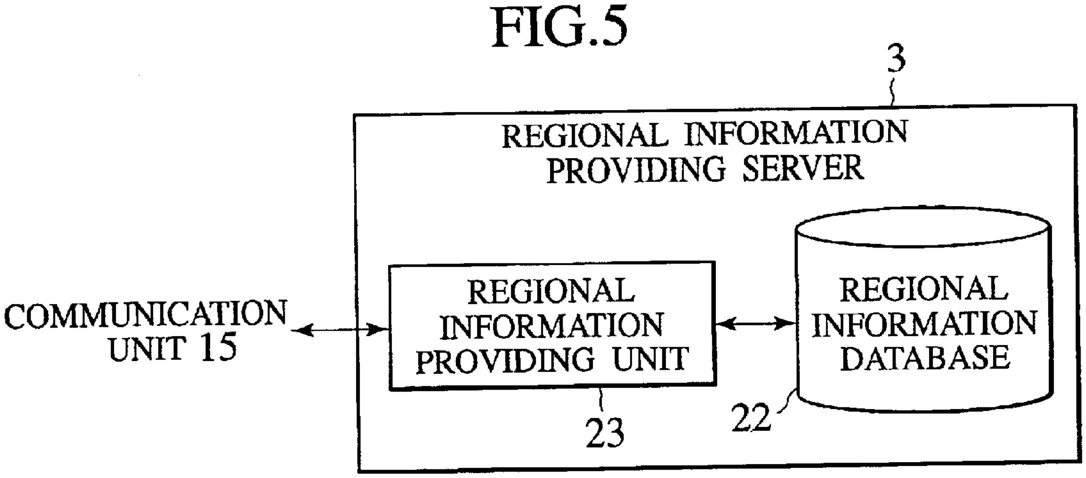
FIG. 5 is a block diagram showing a schematic configuration of a regional information providing server in the communication system of FIG. 1.

The regional information providing server 3 provides the regional information according to the location of the terminal device 2. FIG. 5 shows a schematic configuration of the regional information providing server 3. As shown in FIG. 5, the regional information providing server 3 comprises a regional information database 22 and a regional information providing unit 23.

The regional information database 22 stores the regional information, which may include information regarding various facilities such as hospitals, museums, amusement parks, restaurants, various kinds of stores, etc., information regarding events, road guidance information indicating a distance to the destination, a mark such as a name of a next crossing, a direction for moving, etc., map information, information regarding public transportation systems such as transfer junction maps and timetables, information regarding traffic jams, traffic accidents, and troubles occurring in each region, advertisements such as those offering coupons, information regarding locations of elevators, steps, slopes, etc., intended for the handicapped person, wounded person, aged person, and the user of wheelchair or buggy, for example.

The regional information providing unit 23 acquires the location detected by the location detection unit 16, retrieves the regional information according to that location from the regional information database 22, and provides that regional information to the terminal device 2. Note that the regional information providing unit 23 can acquire the location transmitted from the radio communication unit 20 of the terminal device 2 and the radio communication unit 20 of the terminal device 2 can acquire the regional information transmitted from the regional information providing unit 23, through the radio communication unit 14 by connecting the communication unit 15 and the regional information providing server 3 through the communication network 5.

There are also cases where the user always wishes to have the regional information regarding locations of elevators, steps, slopes, etc. provided as in the case where the user is handicapped, aged, or using a wheelchair. In such cases, it is possible to make a setting such that the radio communication unit 20 of the terminal device 2 automatically acquires the location given by the calculation result from the calculation unit 21 and transmits the location to the regional information providing server 3.

Also, the regional information providing unit 23 can provide the information according to any of SMTP (Simple Mail Transfer Protocol) which is an e-mail sending protocol for transmitting an e-mail or an e-mail with its appended file, HTTP (HyperText Transfer Protocol) which is a communication protocol for transmitting/receiving data described in HTML format or the like, FTP (File Transfer Protocol) which is a protocol for transmitting data as files, etc.

Figure 6:
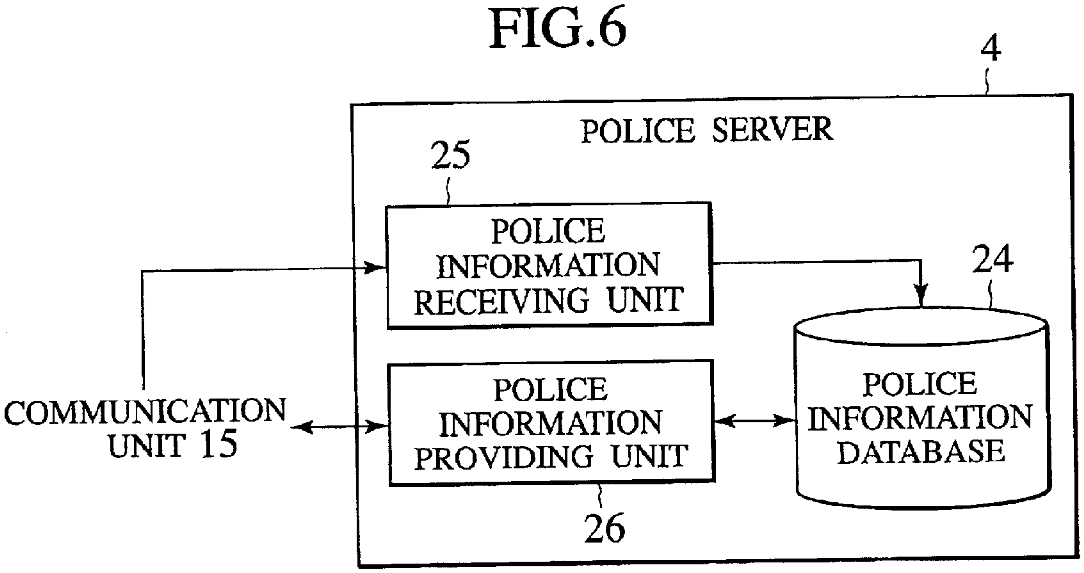
FIG. 6 is a block diagram showing a schematic configuration of a police server in the communication system of FIG. 1.

The police server 4 manages the police information. FIG. 6 shows a schematic configuration of the police server 4. As shown in FIG. 6, the police server 4 comprises a police information database 24, a police information receiving unit 25 and a police information providing unit 26. The police information database 24 stores the police information, such as information regarding traffic accidents, troubles, etc., information regarding missing children, aged persons, handicapped persons, etc., information regarding wanted criminals, road guidance information, map information, etc.

The police information receiving unit 25 receives the police information transmitted from the terminal device 2 used by a policeman, and store it into the police information database 24. For example, when a traffic accident occurs, the policeman at the accident site can enter the speech input regarding the accident status report or the interview report using a microphone or the like capable of entering the speech input as the input unit 17 of the terminal device 2 and store it as the speech information in the memory unit 18, or the policeman at the accident site can take photographs of the accident site by using the terminal device 2 equipped with a digital camera or a CCD camera and store them into the memory unit 18, so as to create the police information such as an investigation record.

Note that, in such a case, it is possible to create an investigation record by checking the location of the accident site by detecting the location of the terminal device 2 by using the location detection unit 16. In this way, it is possible to create the police information that contains the accurate location of the terminal device 2. It is also possible to create the investigation record using the regional information obtained by utilizing the regional information providing server 3.

The police information such as the investigation record created in this way is acquired by the radio communication unit 20 of the terminal device 2 from the memory unit 18 and transmitted to the radio communication unit 14 of the information providing device 8. Then, the police information transmitted by the terminal device 2 is received by the police information receiving unit 25 and stored into the police information database 24 through the radio communication unit 14, by connecting the communication unit 15 and the police server 4 through the communication network 6.

Note that the police information receiving unit 25 should preferably has a function for storing the received police information in a form of the speech information into the police information database 24 after converting it into the text format information. More specifically, it is possible to convert the entered speech information into the text format information by using the speech recognition technique such as the LaLaVoice developed by Toshiba Corp. It is also possible to use the terminal device 2 having a function for converting the speech input information into the text format information such that the information is transmitted to the radio communication unit 14 after it is converted into the text format information.

The police information providing unit 26 provides the police information to the terminal device 2 used by a policeman. For example, the location detected by the location detection unit 16 is acquired, and the police information according to that location such as information regarding missing children, handicapped persons, and aged persons around the policeman who uses the terminal device 2 or information regarding wanted criminals is retrieved from the police information database 24 and provided to the terminal device 2. In this way, the police information according to the accurate location of the terminal device 2 detected by the location detection unit 16 is provided so that the police information suitable for the actual location of the policeman can be provided. Note that it is also possible to provide information unrelated to the location of the terminal device 2.

It is also possible to receive a request for providing the police information from the terminal device 2 used by the policeman, and retrieve and provide the police information according to that request. For example, when the policeman finds a person resembling the wanted criminal according to his memory or a suspicious person, the policeman can take a photograph of that person by the terminal device 2 equipped with a digital camera or a CCD camera, and send that image data and a request for providing the police information regarding the wanted criminal corresponding to that person from the terminal device 2 to the police information providing unit 26. The police information providing unit 26 that received that request retrieves the matching information from the police information database 24 and provide that matching information to the terminal device 2 according to that photograph.

Note that the police information providing unit 26 can acquire the location or the request for providing the police information that is transmitted from the radio communication unit 20 of the terminal device 2 and the radio communication unit 20 of the terminal device 2 can acquire the police information transmitted by the police information providing unit 26, through the radio communication unit 14 by connecting the communication unit 15 and the police server 4 through the communication network 5. Also, the police information providing unit 26 can provide the information according to any of SMTP, HTTP, FTP, etc.

The communication network 5 connects the regional information providing server 3 with the communication unit 15, while the communication network 6 connects the police server 4 with the communication unit 15, and they can be provided in forms of any of telephone line network, dedicated line network, digital data exchange network, ISDN (Integrated Service Digital Network), PSTN (Public Switched Telephone Network), etc., for example.

(The location detection method using the communication system)

Next, the method for detecting the location of the terminal device 2 by the communication system according to this embodiment will be described.

Figure 7:
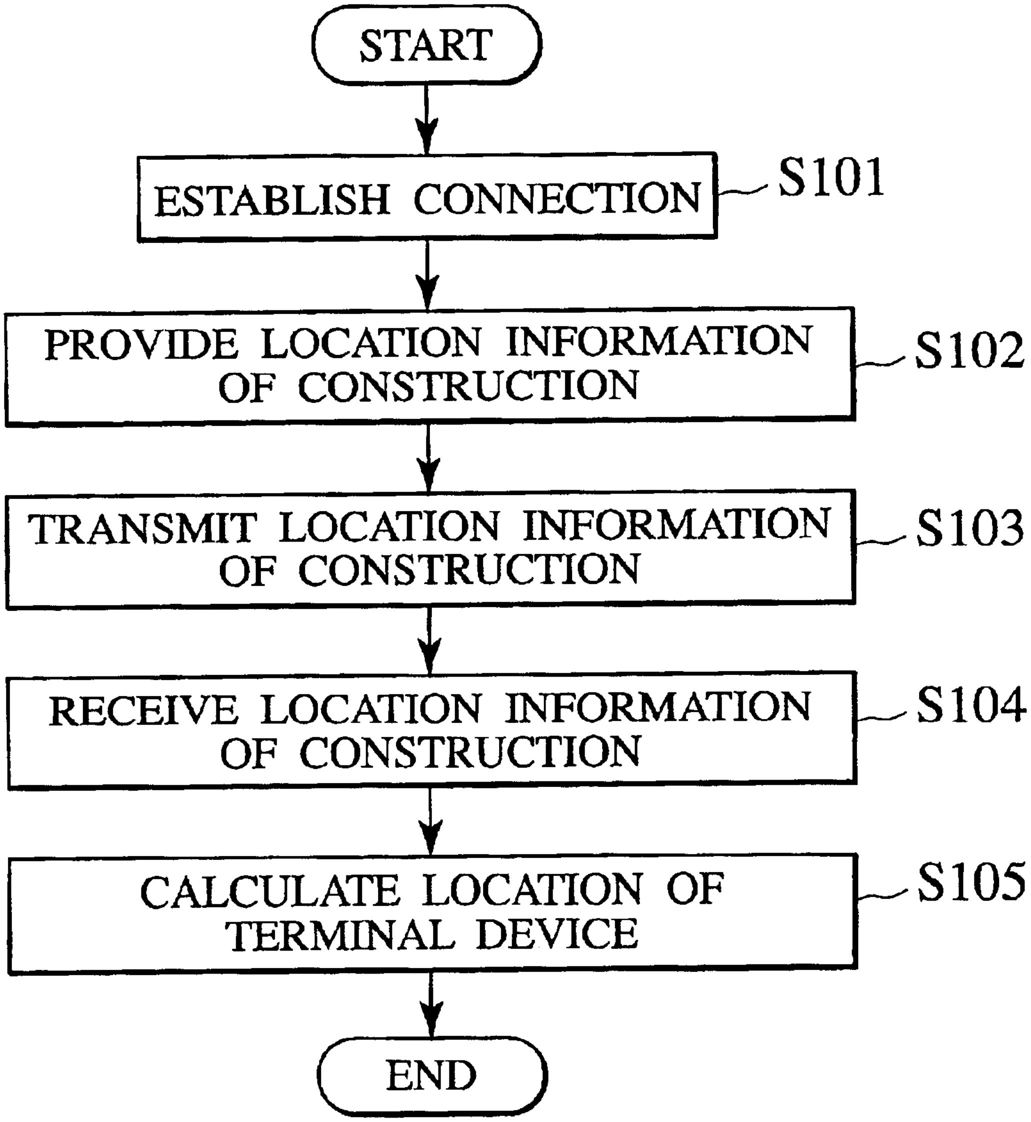
FIG. 7 is a flow chart showing a procedure of a location detection method according to one embodiment of the present invention.

FIG. 7 shows a procedure of the location detection method according to this embodiment. First, a step for establishing a connection between the radio communication unit 14 of the information providing device 8 and the radio communication unit 20 of the terminal device 2 is carried out (step S101). More specifically, this step is carried out as follows. The radio communication unit 14 transmits a communication request while switching the channels 1600 times per second. On the other hand, the radio communication unit 20 is waiting for the communication request from the radio communication unit 14 while switching the channels by always the same hopping pattern. When the channels of the radio communication unit 14 and the radio communication unit 20 coincide and the synchronization is established, the radio communication unit 20 starts the operation by the same hopping pattern as the radio communication unit 14, and then the connection between the radio communication unit 14 and the radio communication unit 20 is established after the connection authentication.

More specifically, the connection authentication is carried out as follows, Each one of the radio communication unit 14 and the radio communication unit 20 enters a random number in 128 bits, an initialization key, and a Bluetooth address into the connection authentication algorithm and calculates a parameter called SRES (Signal Result). Then, the radio communication unit 14 which is an authentication response side compares the SRES transmitted from the radio communication unit 20 which is the authentication request side with the SRES calculated by the radio communication unit 14 itself, and permits the connection when they are checked as identical.

Next, a step for providing the location information of the construction to the radio communication unit 14 is carried out (step S102). In this embodiment, the location information of the traffic signal 7 is provided from the memory unit 13 to the radio communication unit 14. Next, the radio communication unit 14 carries out a step for transmitting the location information of the construction to the terminal device 2 by using the weak radio signals (step S103). Then, the radio communication unit 20 of the terminal device 2 carries out a step for receiving the location information of the construction by using the weak radio signals (step S104). Finally, the calculation unit 21 carries out a step of calculating the location of the terminal device 2 according to the location information received by the radio communication unit 20 (step S105).

In this embodiment, the location information of the traffic signal 7 is acquired, and the location is calculated and detected by assuming that the terminal device 2 is located within a circle of radius 10 m centered around the location indicated by the location information. Then, the detected location is outputted by the output unit 19. It can also be stored into the memory unit 18. Note that the step S105 can be carried out by establishing the connections between the radio communication unit 20 of the terminal device 2 and the radio communication units 14 of a plurality of the base stations 1 located within the reaching range of the weak radio signals from the radio communication unit 20 at the step S101, and then acquiring the location information of the construction and the received radio signal intensities from a plurality of the radio communication units 14 and calculating the location of the terminal device 2 at the calculation unit 21.

According to the location detection method and the communication system of this embodiment as described above, the location detection unit 16 acquires the location information of the traffic signal 7 by using the weak radio signals from the radio communication unit 14 installed on the traffic signal 7 which is arranged along the road 9 on which the user of the terminal device 2 is moving. Consequently, the location detection unit 16 acquires the location information of the traffic signal 7 within the short reaching range of the weak radio signals from the traffic signal 7 and detects the location of the terminal device 2 according to that location information, so that it is possible to detect the accurate location of the terminal device 2. It is also possible to suppress the power consumption of the terminal device 2 because the weak radio signals are used.

(The regional information providing method using the communication system)

Next, the regional information providing method by the communication system according to this embodiment will be described.

Figure 8:
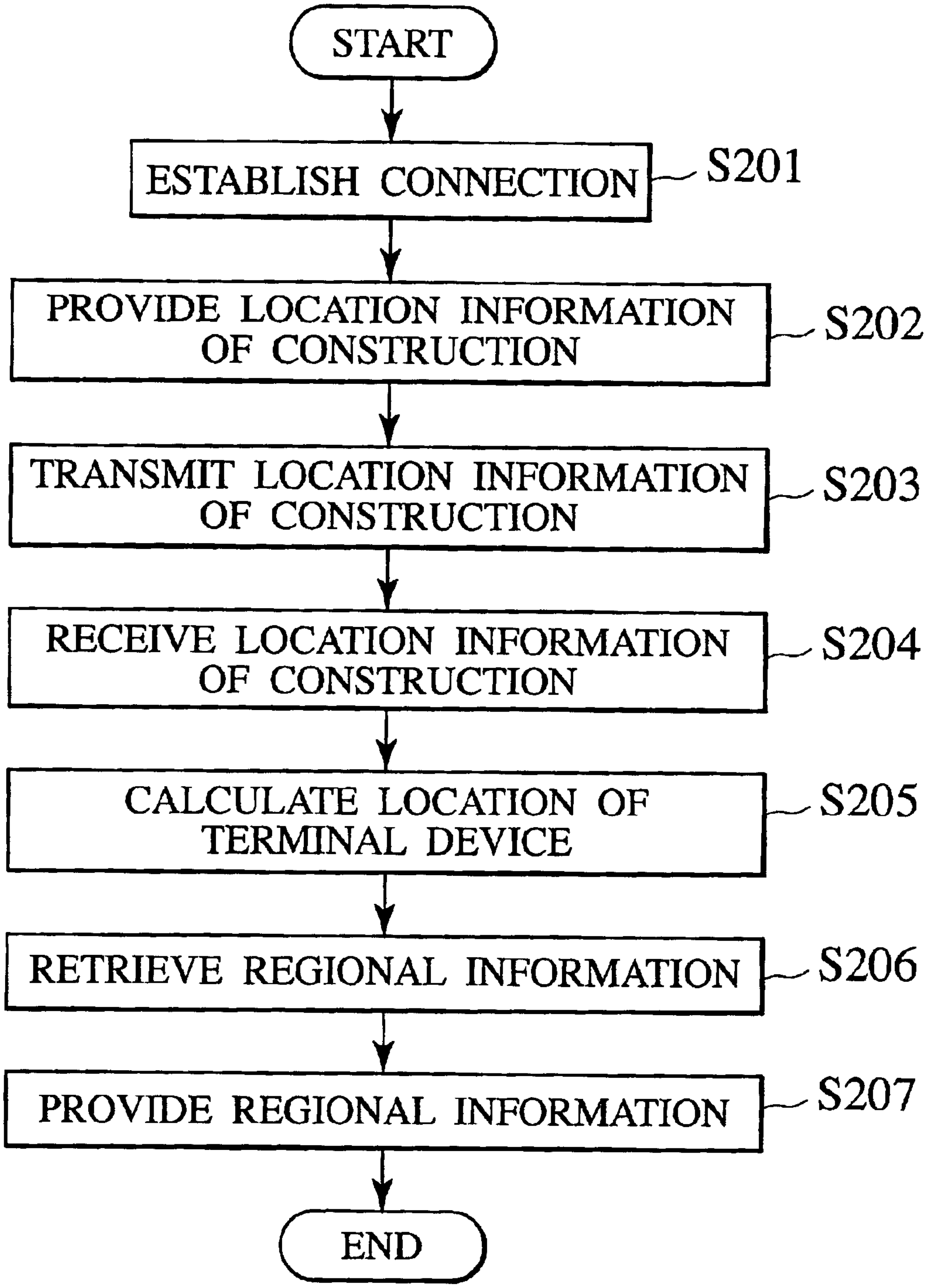
FIG. 8 is a flow chart showing a procedure of a regional information providing method according to one embodiment of the present invention.

FIG. 8 shows a procedure of the regional information providing method according to this embodiment. In this procedure, the steps S201, S202, S203, S204 and S205 are the same as the steps S101, S102, S103, S014 and S105 of the location detection method shown in FIG. 7 so that their description will be omitted here.

After the step S205, the regional information providing unit 23 carries out a step for acquiring the location of the terminal device 2 detected by the location detection unit 16, and retrieves the regional information according to that location from the regional information database 22 (step S206). Finally, the regional information providing unit 23 carries out a step for providing the regional information according to the location of the terminal device 2 retrieved by the step S206 to the terminal device 2 (step S207). Then, the radio communication unit 20 of the terminal device 2 receives this information and this information is outputted as the output unit 19 displays it as characters or images or reproduces it as sounds. It is also possible to store the received information into the memory unit 18.

According to the regional information providing method and the communication system of this embodiment as described above, the regional information according to the accurate location of the terminal device 2 detected by the location detection unit 16 is provided so that it is possible to provide the regional information suitable for the actual location of the terminal device 2.

(The traffic regulation information providing method using the communication system)

Next, the traffic regulation information providing method by the communication system according to this embodiment will be described.

Figure 9:
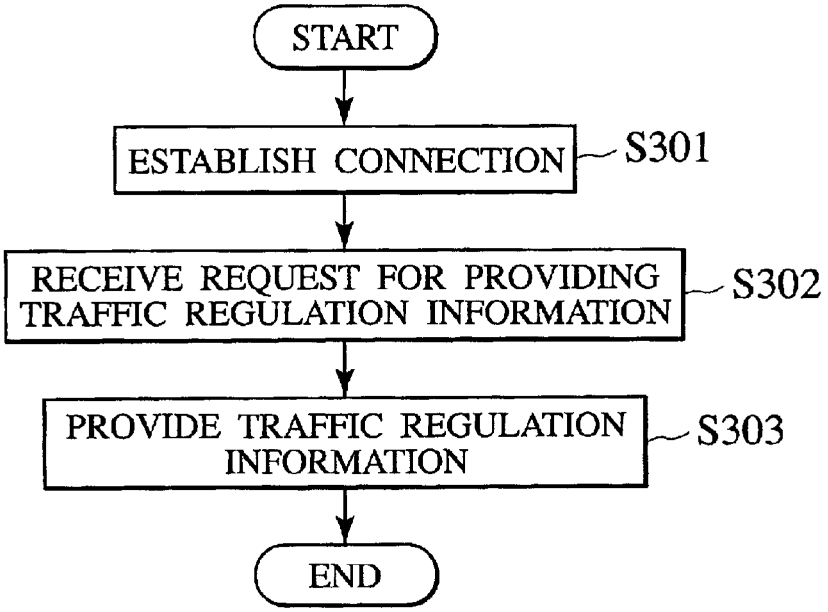
FIG. 9 is a flow chart showing a procedure of a traffic regulation information providing method according to one embodiment of the present invention.

FIG. 9 shows a procedure of the traffic regulation information providing method according to this embodiment. In this procedure, the step S301 is the same as the step S101 of the location detection method shown in FIG. 7 so that its description will be omitted here.

After the step S301, a step for receiving the request for providing the traffic regulation information of the traffic signal 7 from the terminal device 2 is carried out (step S302).

Next, the control unit 10 carries out a step for providing the traffic regulation information to the terminal device 2 according to the request for providing the traffic regulation information received at the step S302 (step S303). The step S303 is carried out as the control unit 10 supplies the traffic regulation information to radio communication unit 14 and the radio communication unit 14 transmits the traffic regulation information to the terminal device 2. The provided traffic regulation information is information indicating that it is traversable, it is X seconds left until it becomes traversable, it is non-traversable, it is X seconds left until it becomes non-traversable, it is a transition stage from the traversable state to the non-traversable state, it is a red signal, it is a green signal that is flashing, it is a green signal that will continue to be on for another so and so seconds, etc.

Then, the terminal device 2 receives the traffic regulation information at the radio communication unit 20 and output it from the output unit 19. In the output, the content of the traffic regulation information can be displayed directly as characters or images or reproduced as speeches from the loudspeaker. It is also possible to use a method for continuously outputting the vibration or a specific sound while it is traversable, or a method for setting up a speech indicating the red signal in advance and outputting that speech according to the traffic regulation information.

Note that, in the case where the terminal device 2 is a portable telephone or the like, it is preferable to set up such that the traffic regulation information is outputted by a sound different from the call terminating sound of the telephone. Also, the user can select what kind of the output unit 19 is to be used according to the need. For example, the visually handicapped person can use the output using the speeches, the aurally handicapped person can use the output using characters or images, and the visually and aurally handicapped person can use the output using vibration.

According to the traffic regulation information providing method and the communication system of this embodiment as described above, the traffic regulation information is provided from the radio communication unit 14 to the radio communication unit 20 of the terminal device 2 so that the user of the terminal device 2 who is moving on the road 9 can learn the traffic regulation information of the traffic signal 7 on the terminal device 2 at his hand so that the state of the traffic regulation by the traffic signal 7 can be comprehended easily. Also, the conventional method for notifying the traffic regulation information by the speech from the loudspeaker provided at the traffic signal 7 has been associated with a problem of producing the annoying noises to the neighbors, but such a problem is also resolved as the traffic regulation information is notified only to the user of the terminal device 2 by the output unit 19 of the terminal device 2.

(The traffic regulation pattern changing method using the communication system)

Next, the traffic regulation pattern changing method using the communication system according to this embodiment will be described.

Figure 10:
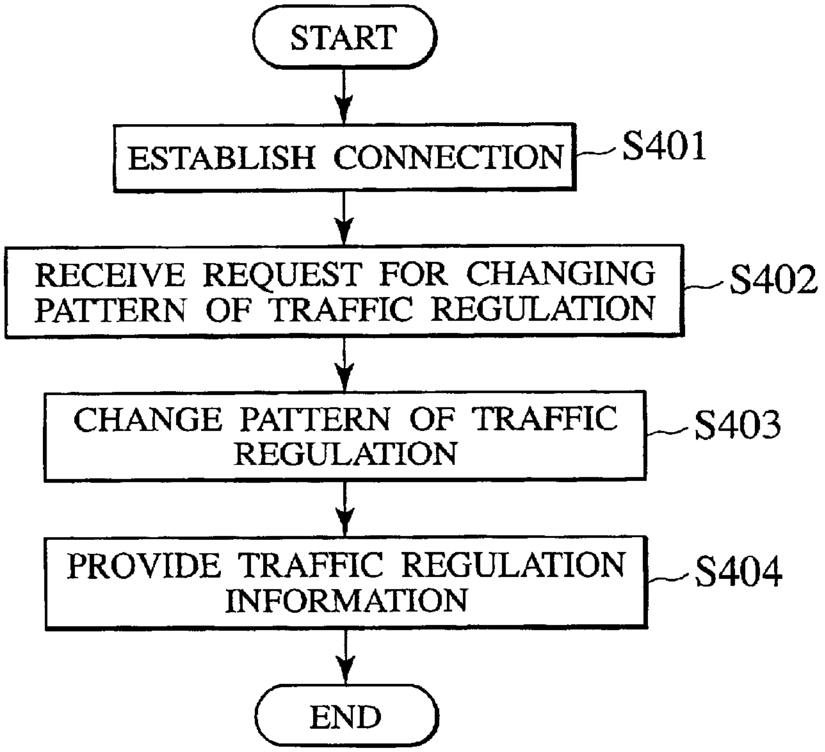
FIG. 10 is a flow chart showing a procedure of a traffic regulation pattern changing method according to one embodiment of the present invention.

FIG. 10 shows a procedure of the traffic regulation pattern changing method according to this embodiment. In this procedure, the step S401 is the same as the step S101 of the location detection method shown in FIG. 7 so that its description will be omitted here.

After the step S401, a step for receiving the request for changing the traffic regulation pattern with respect to the control unit 10 from the terminal device 2 is carried out (step S402).

Next, the control unit 10 carries out a step for changing the traffic regulation pattern and carries out the traffic regulation according to the request for changing the traffic regulation pattern received at the step S402 (step S403). Then, the control unit 10 carries out a step for providing the traffic regulation information for the changed traffic regulation pattern to the terminal device 2 (step S404). The provided traffic regulation information is information indicating that the traversable period of time has been extended for X seconds, it will become traversable after X seconds, etc. Then, the terminal device 2 receives the traffic regulation information at the radio communication unit 20 and outputs it at the output unit 19.

According to the traffic regulation pattern changing method and the communication system of this embodiment as described above, the control unit 10 changes the traffic regulation pattern upon receiving the changing request from the terminal device 2. For this reason, the change of the traffic regulation pattern can be requested easily by using the input unit 17, the memory unit 18 and the radio communication unit 20 of the terminal device 2 at hand, and the control unit 10 changes the traffic regulation pattern according to this request so that the pattern can be changed easily.

(The police information supplying method using the communication system)

Next, the police information supplying method by the communication system according to this embodiment will be described.

Figure 11:
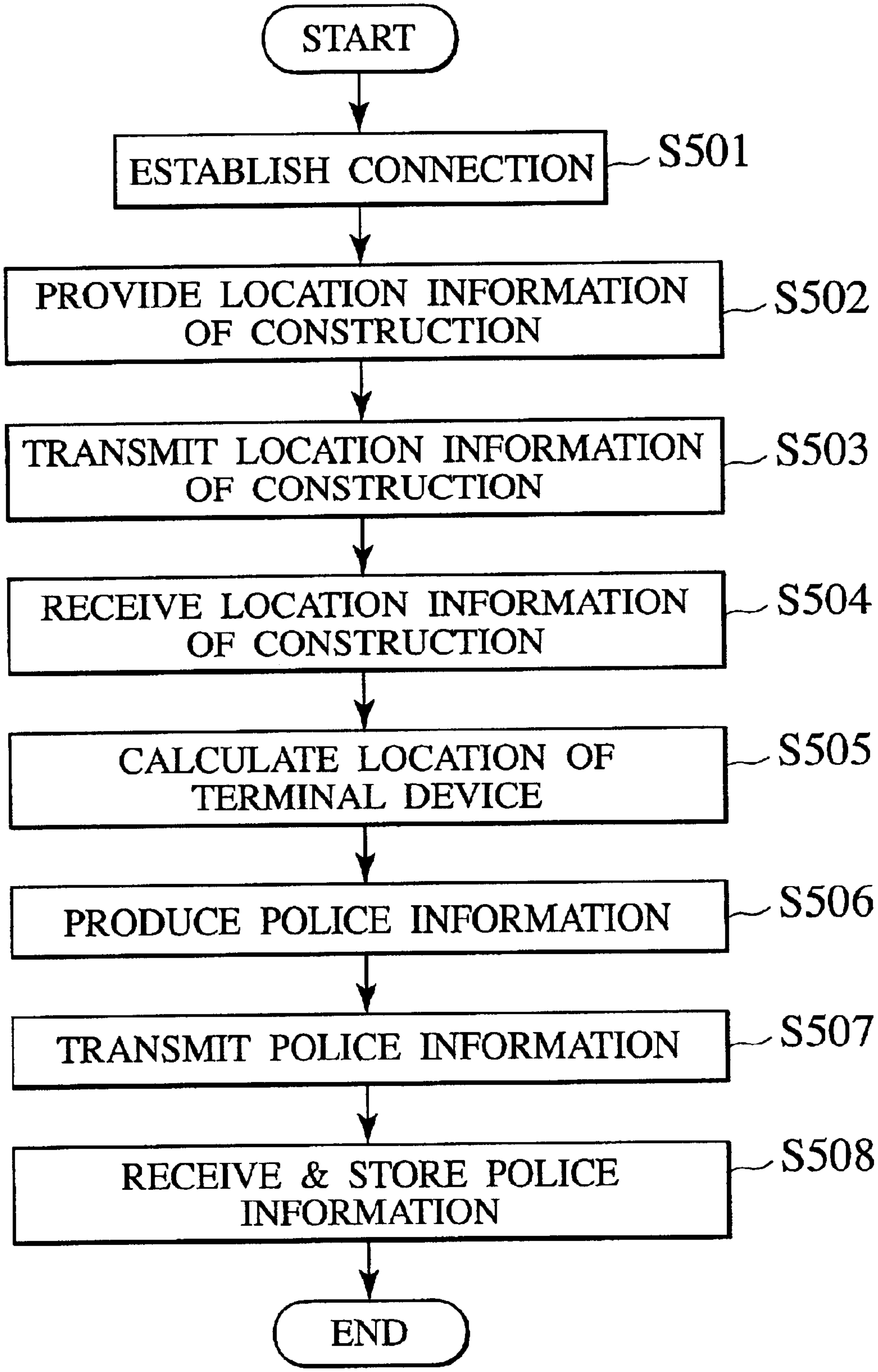
FIG. 11 is a flow chart showing a procedure of a police information supplying method according to one embodiment of the present invention.

FIG. 11 shows a procedure of the police information providing method according to this embodiment. In this procedure, the steps S501, S502, S503, S504 and S505 are the same as the steps S101, S102, S103, S014 and S105 of the location detection method shown in FIG. 7 so that their description will be omitted here.

After the step S505, a step for producing the police information to be supplied to the police information database 24 is carried out (step S506). Then, a step for transmitting the produced police information to the police server 4 is carried out (step S507). In this embodiment, the police information such as the investigation record produced by the step S506 is transmitted from the radio communication unit 20 of the terminal device 2 to the radio communication unit 14 after the encryption processing for preventing the eavesdropping is applied. More specifically, the encryption processing is carried out by transmitting a random number in 128 bits from the radio communication unit 14 to the radio communication unit 20, and entering this random number, an encryption key, and a Bluetooth clock and a Bluetooth address of the radio communication unit 14 into the encryption algorithm.

Finally, a step for receiving the police information transmitted by the step S507 and storing it into the police information database 24 is carried out (step S508). More specifically, the police information transmitted by the terminal device 2 is received by the police information receiving unit 25 through the radio communication unit 14 and stored into the police information database 24 by connecting the communication unit 15 and the police server 4 through the communication network 6. Note that the radio communication unit 14 carries out an operation to recover the original police information when the encrypted police information is received. Also, when the police information received by the police information receiving unit 24 is the speech information, the step S508 may includes the conversion of the speech information into the text format information.

According to the police information supplying method and the communication system of this embodiment as described above, the terminal device 2 can transmit the police information such as the investigation record including the accurate location of the terminal device 2 from the accident site or its vicinity to the base station 1 arranged along the road 9, and the police information receiving unit 25 receives this police information through the base station 1 and stores it into the police information database 24, so that it is possible to store the police information into the police information database 24 in almost real time.

(The police information providing method using the communication system)

Next, the police information providing method by the communication system according to this embodiment will be described.

Figure 12:
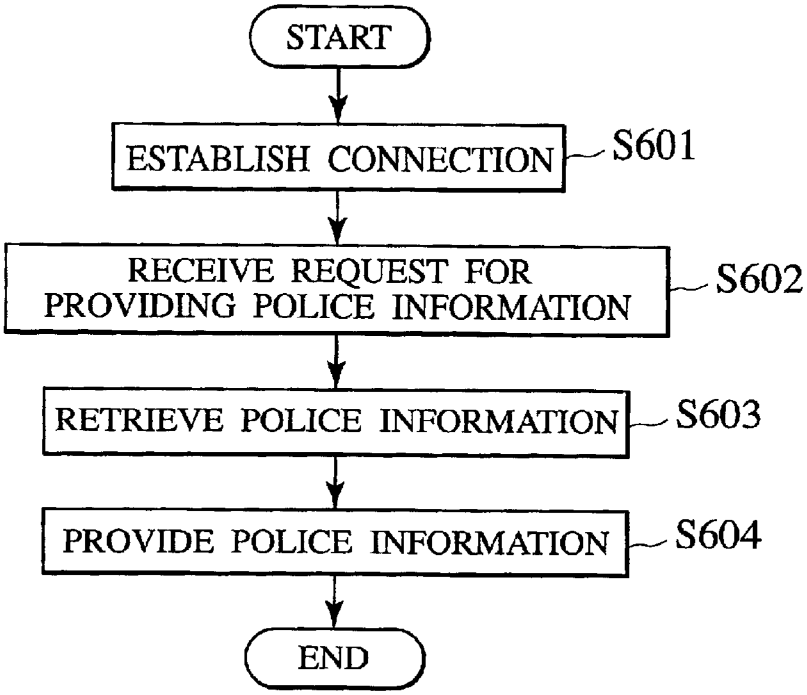
FIG. 12 is a flow chart showing a procedure of a police information providing method according to one embodiment of the present invention.

FIG. 12 shows a procedure of the police information providing method according to this embodiment. In this procedure, the steps S601 is the same as the steps S501 of the police information supplying method shown in FIG. 11 so that its description will be omitted here.

After the step S601, a step for receiving the request for providing the police information from the terminal device 2 used by a policeman is carried out (step S602). Then, the police information providing unit 26 carries out a step for retrieving the police information from the police information database 24 according to the police information providing request received by the step S602 (step S603), and finally, a step for providing the police information retrieved by the step S603 to the terminal device 2 is carried out (step S604).

The police information is transmitted from the police information providing unit 26 to the radio communication unit 20 of the terminal device 2 through the radio communication unit 14. Note that the encryption processing is applied to the police information to be transmitted at a time of transmitting the police information from the radio communication unit 14 to the radio communication unit 20. Then, this encrypted police information is received by the radio communication unit 20 of the terminal device 2, the original police information is recovered from the encrypted police information, and this police information is outputted by the output unit 19. It is also possible to store the received police information in the memory unit 18.

According to the police information providing method and the communication system of this embodiment as described above, the police information providing unit 26 can retrieve the police information from the police information database 24 and provide the police information to the terminal device 2 through the base station 1 arranged along the road 9, so that the user of the terminal device 2 can obtain the police information easily.

(Exemplary modifications)

The above described embodiment of the present invention can be modified as follows.

Figure 13:
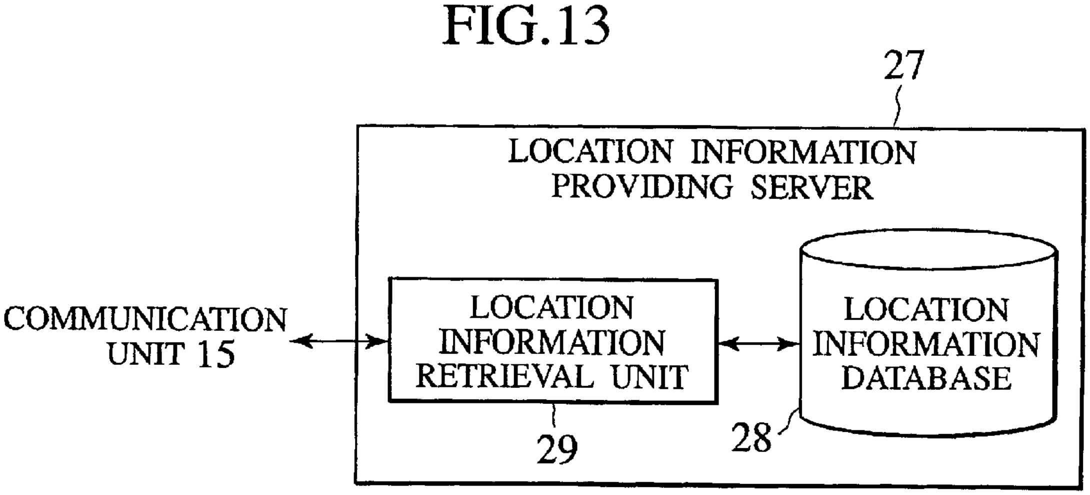
FIG. 13 is a block diagram showing a schematic configuration of a location information providing server that can be used in the communication system of FIG. 1.

For example, as shown in FIG. 13, it is possible to provide a location information providing server 27 comprising a location information database 28 and a location information retrieval unit 29, as an element for providing the location information, instead of the memory unit 13 provided in the information providing device 8 to be installed on the traffic signal 7. The location information providing server 27 is connected with he communication unit 15 through a communication network.

Here, each traffic signal 7 is assigned with a traffic signal number, and the location information database 28 stores a relationship between the traffic signal number of each traffic signal and the location information. The location information retrieval unit 29 receives the traffic signal number of the traffic signal 7 provided through the communication unit 15, retrieves the location information of the traffic signal 7 from the location information database 28 according to this traffic signal number, and provides the location information of the traffic signal 7 to the radio communication unit 14 through the communication unit 15.

When the location information of the traffic signal 7 is changed due to the land readjustment or the like, for example, there will be a need to change the entire stored contents of the memory unit 13 installed on each traffic signal 7 in the case of using the memory unit 13 as an element for providing the location information. In contrast, in the case of using the location information providing server 27, it suffices to change the stored contents of the location information database 28 collectively, so that the location information maintained by an element for providing the location information can be changed easily.

Also, in the above described police information supplying method, when a traffic accident occurs at a crossing, for example, there is a case where the policeman enters into the crossing in order to detect the location of the terminal device 2, investigate the state of the accident, and produce the investigation record. In such a case, the policeman can establish the connection between the radio communication unit 14 and the radio communication unit 20 and make the request for changing the traffic regulation pattern to that for making all the traffic signals 7 at the crossing non-traversable first, and then enter into the crossing to detect the location, investigate the state of the accident and produce the investigation record. After the investigation record is produced, the policeman can make the request for changing the traffic regulation pattern of all the traffic signals 7 at the crossing back to the normal traffic regulation pattern.

As described, according to the present invention, it is possible to detect the accurate location of the terminal device while suppressing the power consumption of the terminal device. It is also possible to enable an easy comprehension of the state of the traffic regulation by the traffic signal.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A communication system, comprising:

a location information providing unit configured to provide a location information indicating a location of each road related facility arranged along a road; and a communication unit installed on each road related facility, configured to transmit the location information of each road related facility to a portable terminal device of a pedestrian user on the road by using weak radio signals, such that the portable terminal device that can receive the weak radio signals can detect a location of the portable terminal device according to the location information and utilize a detected location for purpose of acquiring other information related to the location of the portable terminal device.

2. The communication system of claim 1, wherein the communication unit transmits the location information by using the weak radio signals according to a non-directional short range radio communication scheme.

3. The communication system of claim 2, wherein the communication unit transmits the location information by using the weak radio signals of Bluetooth.

4. The communication system of claim 1, wherein the communication unit is installed on each road related facility that is located at a crossing on the road.

5. The communication system of claim 1, wherein the communication unit is installed on each road related facility which is a traffic signal.

6. The communication system of claim 5, further comprising:

a control unit configured to control the traffic signal to carry out a traffic regulation, and provide a traffic regulation information regarding the traffic regulation carried out by the traffic signal to the portable terminal device in response to a request from the portable terminal device.

7. The communication system of claim 6, wherein the control unit also changes a pattern of the traffic regulation to be carried out by the traffic signal according to a request from the portable terminal device.

8. The communication system of claim 1, further comprising:

a regional information providing server configured to provide a regional information to the portable terminal device according to the location of the portable terminal device detected according to the location information.

9. The communication system of claim 1, further comprising:

a police server configured to provide a police information to the portable terminal device according to the location of the portable terminal device detected according to the location information.

10. The communication system of claim 1, wherein the communication unit is also configured to receive a police information containing information on the location of the portable terminal device according to the location information, which is transmitted from the portable terminal device by using the weak radio signals, and transmit the police information to a police server.

11. A communication system, comprising:

a control unit configured to control a traffic signal on a road to carry out a traffic regulation; and a communication unit installed on the traffic signal, configured to transmit a traffic regulation information regarding the traffic regulation carried out by the traffic signal to a portable terminal device of a pedestrian user on the road in response to a request from the portable terminal device, such that the pedestrian user can ascertain the traffic regulation carried out by the traffic signal, through the portable terminal device according to the traffic regulation information.

12. The communication system of claim 11, wherein the communication unit transmits the traffic regulation information by using the weak radio signals according to a non-directional short range radio communication scheme.

13. The communication system of claim 11, wherein the control unit also changes a pattern of the traffic regulation to be carried out by the traffic signal according to a request from the portable terminal device.

14. A communication method, comprising:

providing a location information indicating a location of each road related facility arranged along a road; and transmitting the location information of each road related facility to a portable terminal device of a pedestrian user on the road by using weak radio signals from a communication device installed on each road related facility, such that the portable terminal device that can receive the weak radio signals can detect a location of the portable terminal device according to the location information and utilize a detected location for purpose of acquiring other information related to the location of the portable terminal device.

15. A communication method, comprising:

controlling a traffic signal on a road to carry out a traffic regulation; and transmitting a traffic regulation information regarding the traffic regulation carried out by the traffic signal from a communication device installed on each road related facility arranged along a road to a portable terminal device of a pedestrian user on the road in response to a request from the portable terminal device, such that the pedestrian user can ascertain the traffic regulation carried out by the traffic signal, through the portable terminal device according to the traffic regulation information.

* * * * *